United States Patent [19]

Lingle

[11] Patent Number: 5,030,256

[45] Date of Patent: Jul. 9, 1991

[54] AUTOMOTIVE AIR FILTER CONSTRUCTION

[76] Inventor: Thomas A. Lingle, R.D. #4, Box 425, Lebanon, Pa. 17042

[21] Appl. No.: 493,626

[22] Filed: Mar. 15, 1990

[51] Int. Cl.⁵ .............................................. B01D 47/00

[52] U.S. Cl. .............................................. 55/233; 55/498; 55/524

[58] Field of Search .............................. 55/233, 498, 524

[56] References Cited

U.S. PATENT DOCUMENTS

| | | | |
|---|---|---|---|
| 2,637,540 | 5/1953 | Rowe | 55/233 |
| 2,843,216 | 7/1958 | Powell | 55/233 |
| 3,075,750 | 1/1963 | Goettl | 55/233 |
| 3,090,179 | 5/1963 | Powell | 55/233 |
| 3,105,749 | 10/1963 | Gebert et al. | 55/233 |
| 3,488,038 | 6/1969 | Pall et al. | 55/233 |
| 3,791,102 | 2/1974 | Huntington | 55/233 |
| 3,823,926 | 7/1974 | Bracich | 55/233 |
| 3,834,683 | 9/1974 | McDuffee | 55/233 |
| 3,861,894 | 1/1975 | Marsh | 55/233 |
| 3,957,468 | 5/1976 | Voth et al. | 55/229 |
| 3,991,724 | 11/1976 | Geiser | 55/233 |
| 4,224,042 | 9/1980 | Garigioli | 55/237 |
| 4,235,609 | 11/1980 | Garigioli | 55/498 |
| 4,316,726 | 2/1982 | Hopper | 55/233 |
| 4,323,373 | 4/1982 | Fritz | 55/233 |
| 4,578,091 | 3/1986 | Borja | 55/233 |

*Primary Examiner*—Jay H. Woo
*Assistant Examiner*—C. Scott Bushey
*Attorney, Agent, or Firm*—Leon Gilden

[57] ABSTRACT

An air filter including an annular base mounting a porous filtration member medially thereon, with a forward mesh grid and a rear perforated cylindrical plate, wherein the filtration member includes a semi-annular groove mounted medially throughout a top portion thereof, wherein the groove receives a continuous tubular reservoir. The reservoir includes through-extending apertures including an overlying removable tape thereon, whereupon removal of the tape, the reservoir includes a quantity of solvent directed interiorly of the carburetor during operation of the vehicle to effect a cleansing of the carburetor in use.

5 Claims, 4 Drawing Sheets

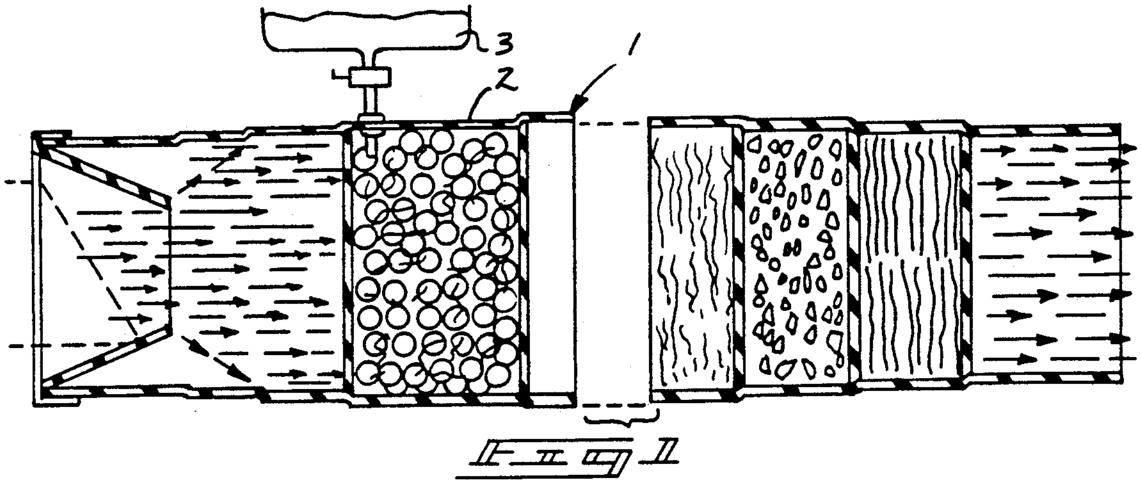
FIG. 1
PRIOR ART
FIG. 2
PRIOR ART
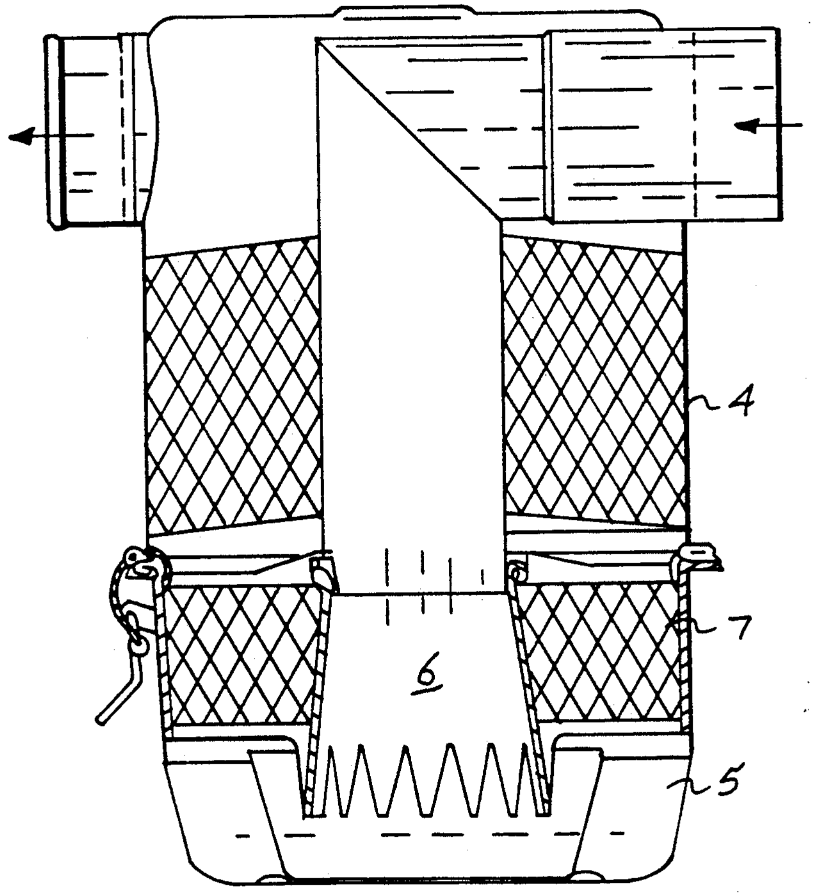

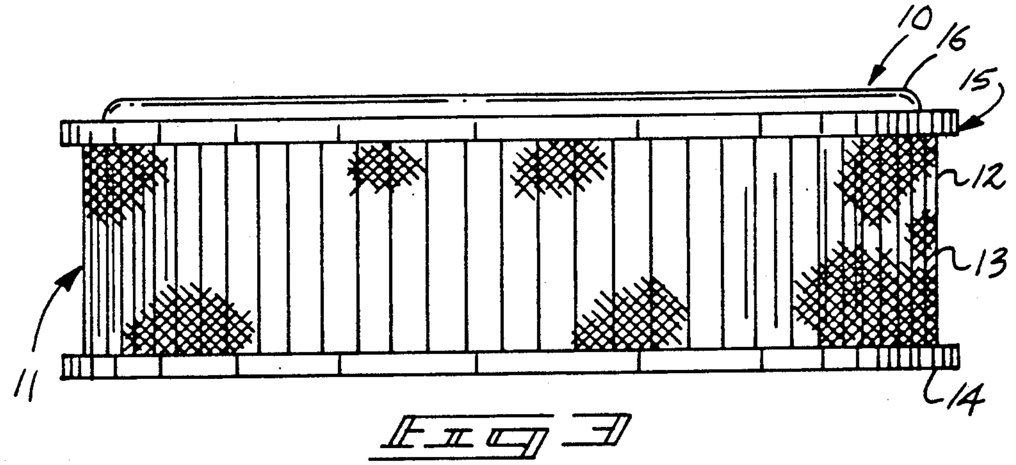
Fig 3
Fig 4
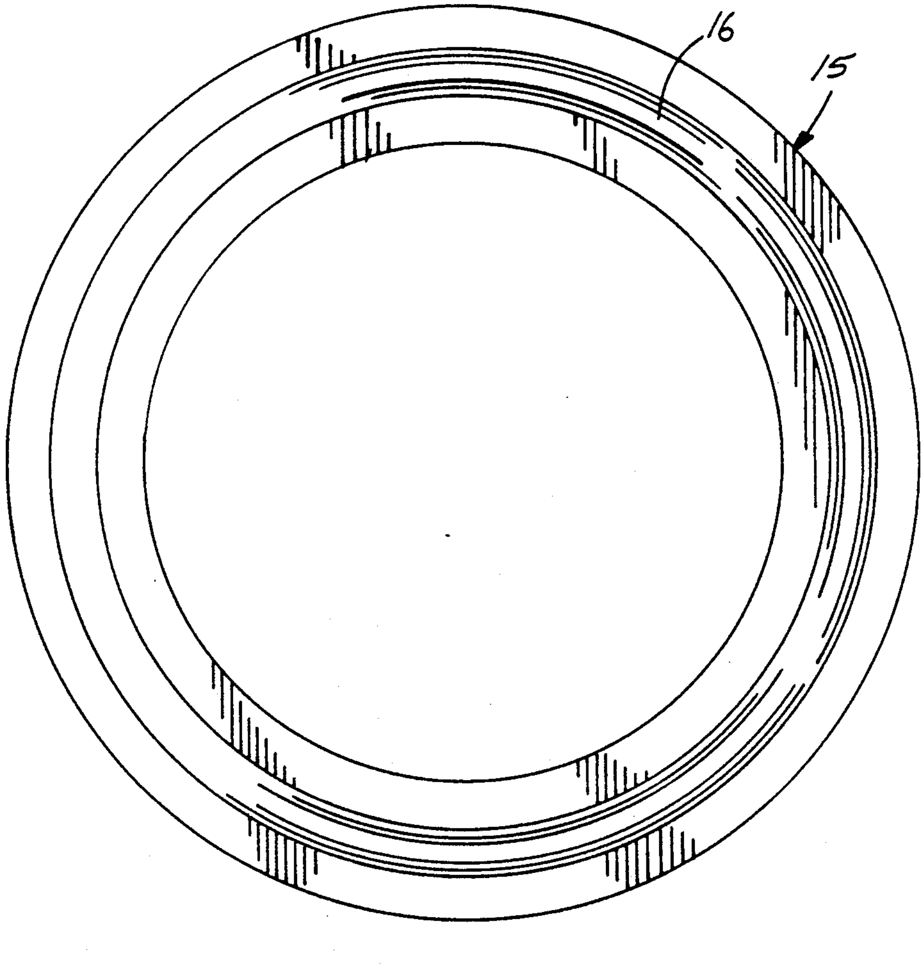

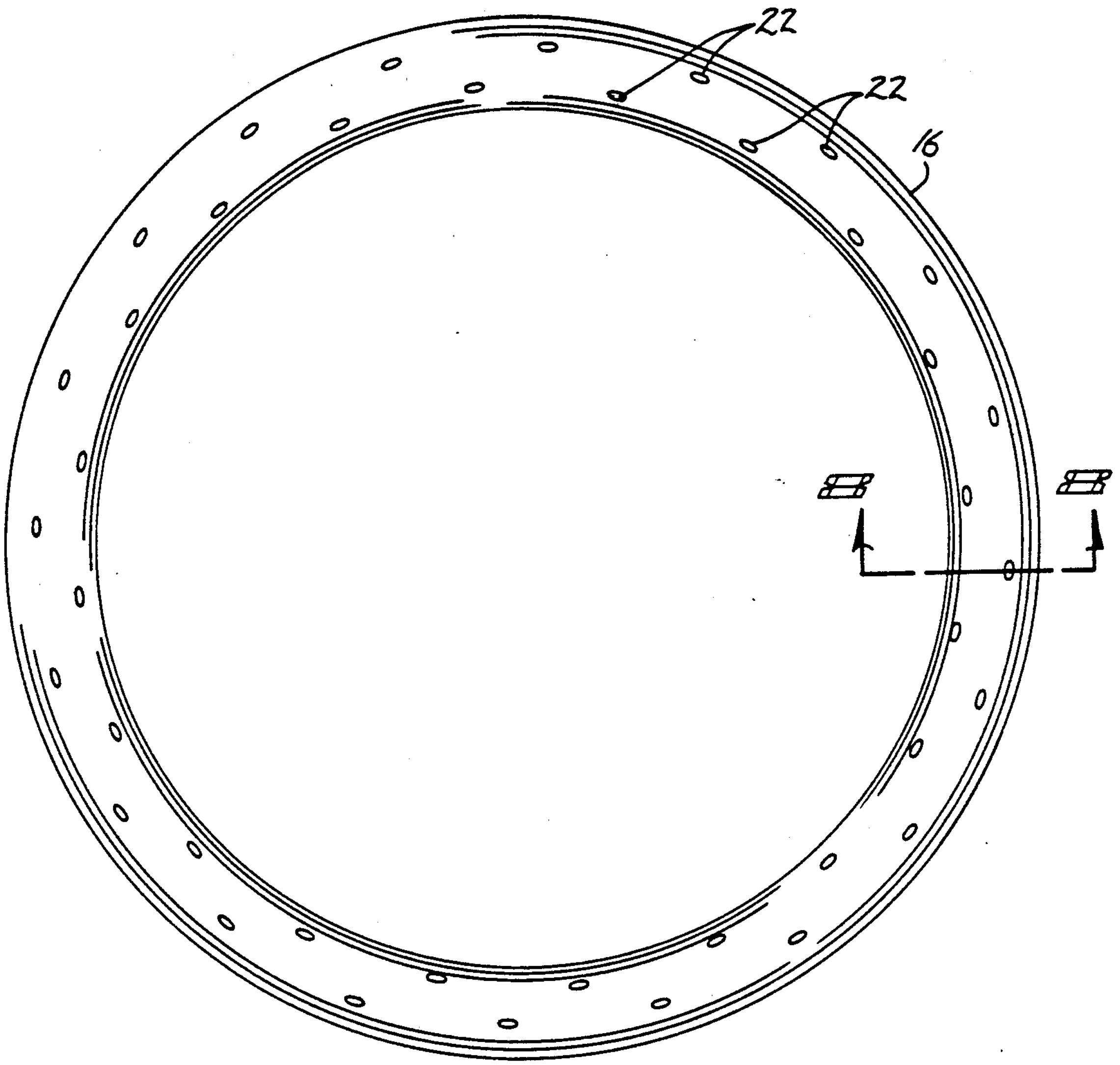
FIG. 7
FIG. 8
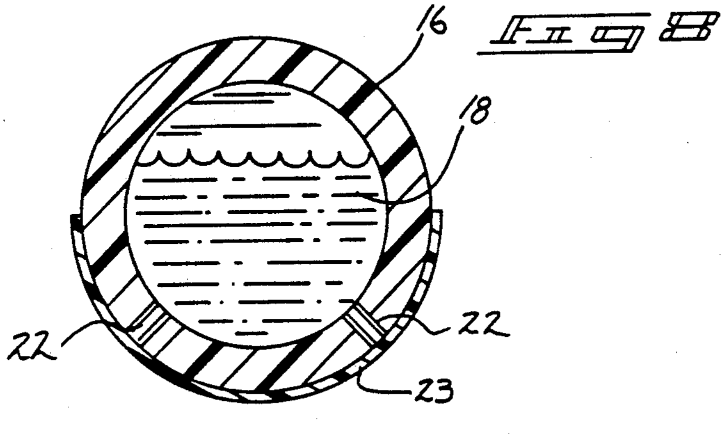

AUTOMOTIVE AIR FILTER CONSTRUCTION

BACKGROUND OF THE INVENTION

1. Field of the Invention

The field of invention relates to automotive air filters, and more particularly pertains to a new and improved automotive air filter construction wherein the same permits directing of automotive solvent during usage of the air filter to effect a cleaning of the carburetor and internal components of the engine during operation of the engine and vehicle.

2. Description of the Prior Art

Automotive air filters, as well as filtration devices of various types, have been utilized in the prior art. Heretofore, however, automotive air filters utilizing a solvent utilized during use of the automobile has not been provided in efficient and coordinated organization, as set forth by the instant invention. Examples of prior art air filtration organizations are exemplified by U.S. Pat. No. 4,578,091 to Borja providing a multi-chambered air cleaning device wherein one of the chambers includes a fluid overlying a chamber, wherein the fluid, such as water, is directed within the particulated chamber to enhance cleansing of air directed through the filter.

U.S. Pat. No. 4,224,042 to Garigioli sets forth an oil bath-type air cleaner wherein air directed through a central conduit of the filter is directed through an oil bath at a lowermost portion of the filter to assist in cleansing of the air directed through the filtration system.

U.S. Pat. No. 4,316,726 to Hopper provides a manner of cleansing fluids wherein a spray is directed upon a filtration medium utilized in an air stream.

U.S. Pat. No. 4,235,609 to Garigoli sets forth a further example of a lowermost pool of fluid utilized to cleanse air directed through the fluid and subsequently, exteriorly of the filtration member.

U.S. Pat. No. 3,957,468 to Voth, et al., provides a carburetor utilizing a baffled inlet of air, wherein the air is directed through a filtration member.

As such, it may be appreciated that there continues to be a need for a new and improved automotive air filter construction wherein the same permits utilizing selectively a carburetor solvent type cleanser directed interiorly of the air filter body for directing the solvent into the internal components of an automotive engine during use of the engine and in this respect, the present invention substantially fulfills this need.

SUMMARY OF THE INVENTION

In view of the foregoing disadvantages inherent in the known types of automotive air cleaners now present in the prior art, the present invention provides an automotive air filter construction wherein the same utilizes a reservoir of solvent that may be selectively directed interiorly of an automobile engine to effect cleansing of the engine and associated carburetor during use of the engine. As such, the general purpose of the present invention, which will be described subsequently in greater detail, is to provide a new and improved automotive air filter construction which has all the advantages of the prior art automotive air cleaners and none of the disadvantages.

To attain this, the present invention provides an air filter including an annular base mounting a porous filtration member medially thereon, with a forward mesh grid and a rear perforated cylindrical plate, wherein the filtration member includes a semi-annular groove mounted medially throughout a top portion thereof, wherein the groove receives a continuous tubular reservoir. The reservoir includes through-extending apertures including an overlying removable tape thereon, whereupon removal of the tape, the reservoir includes a quantity of solvent directed interiorly of the carburetor during operation of the vehicle to effect a cleansing of the carburetor in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive air filter construction which has all the advantages of the prior art air filter cleaners and none of the disadvantages.

It is another object of the present invention to provide a new and improved automotive air filter construction which may be easily and efficiently manufactured and marketed.

It is a further object of the present invention to provide a new and improved automotive air filter construction which is of a durable and reliable construction.

An even further object of the present invention is to provide a new and improved automotive air filter construction which is susceptible of a low cost of manufacture with regard to both materials and labor, and which accordingly is then susceptible of low prices of sale to the consuming public, thereby making such automotive air filter constructions economically available to the buying public.

Still yet another object of the present invention is to provide a new and improved automotive air filter construction which provides in the apparatuses and methods of the prior art some of the advantages thereof, while simultaneously overcoming some of the disadvantages normally associated therewith.

Still another object of the present invention is to provide a new and improved automotive air filter construction wherein the same permits selective directing of solvent interiorly of an engine to enhance cleansing of the engine while simultaneously assisting in purifying and cleansing of air directed through the filter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic cross-sectional view illustrating a multi-chambered prior art air cleaner.

FIG. 2 is an orthographic cross-sectional view of a further prior art air cleaner arrangement.

FIG. 3 is an orthographic side view taken in elevation of the instant invention.

FIG. 4 is an orthographic top view of the instant invention.

FIG. 7 is a bottom orthographic illustration of the reservoir utilized by the instant invention.

FIG. 8 is an orthographic view, taken along the lines 8—8 of FIG. 7 in the direction indicated by the arrows.

DESCRIPTION OF THE PREFERRED EMBODIMENT

Figure 5:
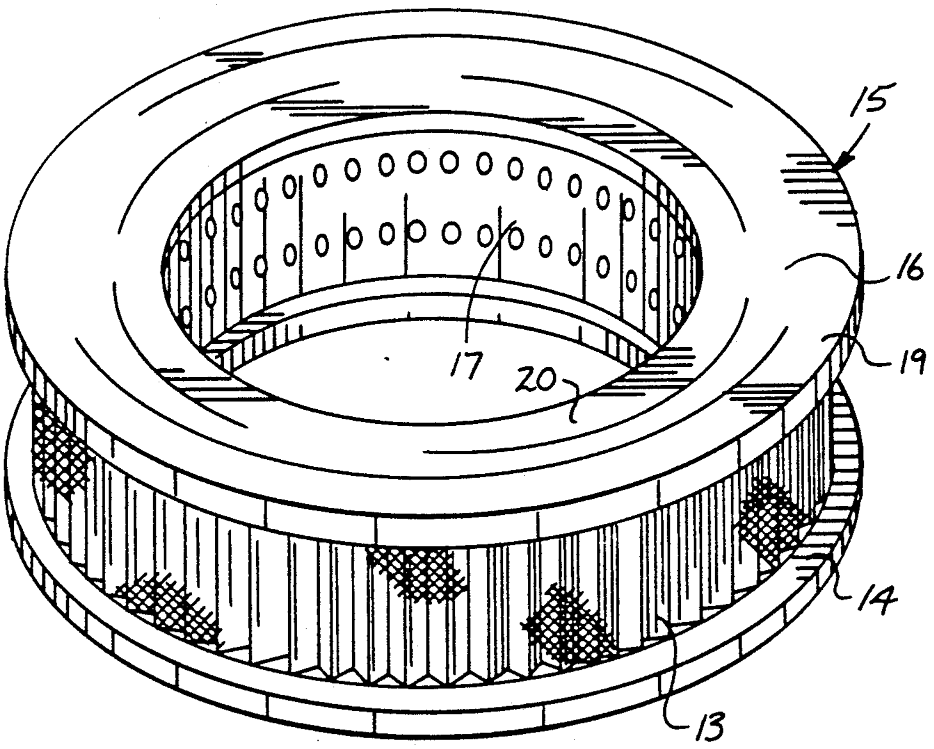
FIG. 5 is an isometric illustration of the instant invention.

With reference now to the drawings, and in particular to FIGS. 1 to 8 thereof, a new and improved automotive air filter construction embodying the principles and concepts of the present invention and generally designated by the reference numeral 10 will be described.

FIG. 1 illustrates a prior art air filter 1 utilizing a multi-chambered tubular filter construction, wherein a chamber 2 includes a matrix of elements therein that receive fluid from a reservoir 3 overlying the chamber, wherein a valve selectively admits fluid from the reservoir 3 into the chamber 2. FIG. 2 illustrates a further prior art air cleaner 4 wherein an underlying bath 5 of a fluid assists in cleansing of air from the conduit 6 directed through the underlying bath and subsequently through the upper chamber 7.

Figure 6:
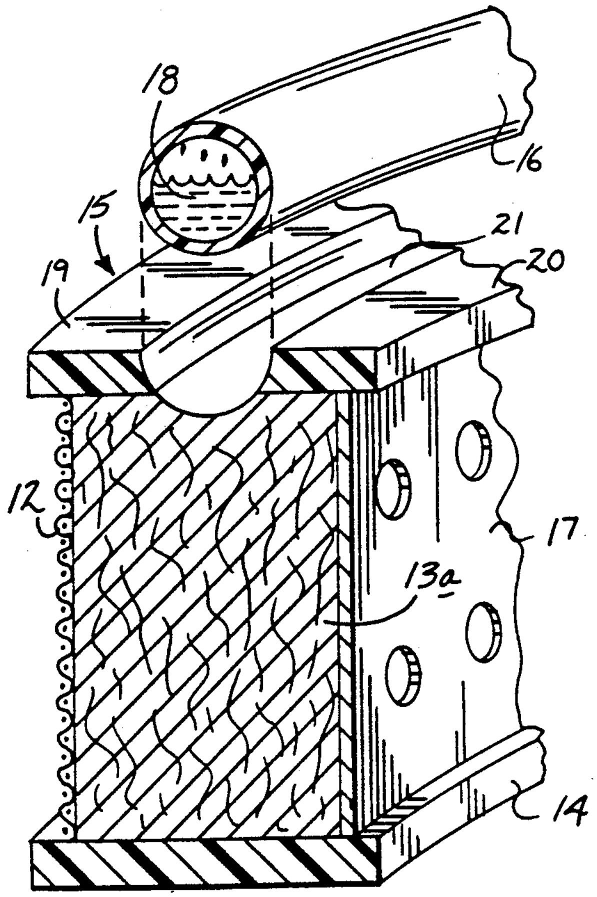
FIG. 6 is a cross-sectional isometric illustration of the instant invention in a somewhat exploded view illustrating the various components their configuration and relationship.

More specifically, the automotive air filter construction 10 of the instant invention essentially comprises a cylindrical filter body 11 defined by a pleated filter element 13 defining a cylinder coaxially aligned with and mounted to an underlying annular lower support base 14. A cylindrical mesh screen 12 is positioned in a surrounding relationship relative to the filter element 13, with the filter element 13 and the mesh screen 12 mounted at their upper ends to an annular upper support base 15. The upper annular support base, the annular lower support base 14, as well as the filter element 13 and mesh screen 12, are all coaxially aligned relative to one another. A perforated cylindrical plate 17 is mounted to a rear surface of the filter element 13 to increase loss of air flow through the various openings within the plate 17. A tubular reservoir 16 is mounted medially of an upper surface of the filter element 13. Reference to FIG. 6 illustrates a modified filter element defined as an air permeable, cylindrical matrix filter **13*a* of enhanced thickness to enhance filtration of air directed therethrough, as well as permitting absorption of a greater quantity of solvent 18 contained within the tubular reservoir 16. The solvent from the tubular reservoir 16 is directed downwardly from the reservoir in use of the organization. The annular upper support base 15 is defined by an outer annular flange 19, including an arcuate inner surface spaced from an inner annular flange 20 formed with an arcuate forward surface, wherein an arcuate recess formed in a top surface of the air permeable cylindrical matrix filter 13*a* is defined as a cavity 21 of a semi-cylindrical cross-sectional configuration complementary to that of the reservoir 16. Reference to FIGS. 7 and 8 illustrate details of the reservoir 16 wherein a series of dispensing apertures 22 are formed throughout the lower quadrant of the reservoir 16. A removable peel-away tape 23 exposes an adhesive thereunder to permit adhering the reservoir within the cavity 21, as well as exposing the dispensing apertures 22 to permit directing of the solvent 16 into the matrix filter body 13*a***.

In use, the directing of the solvent 16 into the underlying filter permits an automotive engine to draw such solvent in appropriate proportions by the air stream created in the operation of an internal combustion engine. In this manner, the solvent in atomized formed is directed through the carburetor and internal components such as valves and the like to enhance cleaning of the automobile engine.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive air filter comprising,
a central, air permeable matrix filter, and
a lower support base integrally mounted to a lower end of the matrix filter, and an upper support base mounted to an upper terminal end of the matrix filter, the upper support base, the lower support base, and the matrix filter coaxially aligned relative to one another, and a fluid reservoir mounted to the upper support base in fluid communication with the matrix filter, and wherein the upper support base, the matrix filter, and the lower support base are each of a generally cylindrical configuration, and the upper support base includes an outer annular flange and an inner annular flange spaced from the outer annular flange to define a gap therebetween, and the air permeable cylindrical matrix filter including a cavity of a generally semi-cylindrical, cross-sectional configuration formed through the top terminal end of the matrix filter, and the reservoir defined as an angular tubular reservoir mounted within the cavity between the outer and inner annular flanges.

2. A filter as set forth in claim 1 wherein the matrix filter includes an annular perforated cylindrical plate mounted to a rear surface of the matrix filter, and a mesh screen mounted to a forward surface of the matrix filter, the perforated cylindrical plate and the mesh screen mounted between the upper and lower support bases.

3. A filter as set forth in claim 2 wherein the fluid contained within the tubular reservoir is a solvent.

4. A filter as set forth in claim 3 wherein the tubular reservoir includes a series of dispensing apertures formed through a lower quadrant of the tubular reservoir overlying the cavity.

5. A filter as set forth in claim 4 further including a removable peel-away tape and an adhesive mounted between the tape and the lower quadrant of the tubular reservoir, wherein removal of the tape exposes the dispensing apertures and permits securement of the reservoir to the cavity.

* * * * *